United States Patent
Lee et al.

(10) Patent No.: US 11,563,395 B2
(45) Date of Patent: Jan. 24, 2023

(54) SYSTEM AND METHOD FOR HEATING BATTERY USING MOTOR DRIVING SYSTEM

(71) Applicants: Hyundai Motor Company, Seoul (KR); Kia Motors Corporation, Seoul (KR)

(72) Inventors: Yong Jae Lee, Gyeonggi-do (KR); Jung Hwi Kim, Gyeonggi-do (KR); Jung Mo Yu, Seoul (KR); Jae Ho Hwang, Daejeon (KR); Joo Young Park, Gyeonggi-do (KR); Jae Hyeon Park, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 275 days.

(21) Appl. No.: 16/950,118

(22) Filed: Nov. 17, 2020

(65) Prior Publication Data
US 2022/0069755 A1 Mar. 3, 2022

(30) Foreign Application Priority Data
Aug. 26, 2020 (KR) .................. 10-2020-0108170

(51) Int. Cl.
*H02P 6/08* (2016.01)
*H02P 27/06* (2006.01)
(Continued)

(52) U.S. Cl.
CPC .......... *H02P 27/06* (2013.01); *H01M 10/615* (2015.04); *H01M 10/625* (2015.04); *H01M 10/637* (2015.04); *H01M 2220/20* (2013.01)

(58) Field of Classification Search
CPC ...... H02P 27/06; H02P 21/14; H02P 2203/03; H01M 10/615; H01M 10/625; H01M 10/637; H01M 2220/20; H02M 7/48
See application file for complete search history.

(56) References Cited

U.S. PATENT DOCUMENTS

| | | | |
|---|---|---|---|
| 2018/0302019 A1* | 10/2018 | Yang | ........................ B60L 15/20 |
| 2019/0199250 A1* | 6/2019 | Hatsu | ......................... H02P 6/10 |
| 2019/0296665 A1* | 9/2019 | Matsubara | ................ H02P 6/12 |

FOREIGN PATENT DOCUMENTS

| | | |
|---|---|---|
| CN | 108666713 A | 10/2018 |
| CN | 108682909 A | 10/2018 |

(Continued)

*Primary Examiner* — Muhammad S Islam
(74) *Attorney, Agent, or Firm* — Fox Rothschild LLP (57) ABSTRACT

A battery-heating system and method using a motor-driving system is provided. The battery-heating system includes an inverter having legs respectively including a pair of switching elements connected in series between the ends of a battery and corresponding to a plurality of phases. A motor of the system includes coils each having one end connected to a connection end between a pair of switching elements of the legs, other ends of the plurality of coils being connected together. A controller determines one of the plurality of phases as a reference phase, and alternately controls the on-off states of the switching elements so that the on-off state of the switching element included in the leg corresponding to the reference phase and the switching element included in the other leg are mutually complementary, thereby generating AC current to be injected into the battery.

18 Claims, 4 Drawing Sheets

(51) Int. Cl.
    *H01M 10/615*    (2014.01)
    *H01M 10/625*    (2014.01)
    *H01M 10/637*    (2014.01)

(56) References Cited

FOREIGN PATENT DOCUMENTS

| CN | 108705943 A | 10/2018 |
|----|-------------|---------|
| CN | 108711662 A | 10/2018 |
| CN | 108736107 A | 11/2018 |
| CN | 108736108 A | 11/2018 |
| CN | 108878996 A | 11/2018 |
| CN | 108879027 A | 11/2018 |
| JP | 2016-004649 A | 1/2016 |
| KR | 10-2011-0112132 A | 10/2011 |

\* cited by examiner

SYSTEM AND METHOD FOR HEATING BATTERY USING MOTOR DRIVING SYSTEM

CROSS REFERENCE TO RELATED APPLICATION

The present application claims priority to Korean Patent Application No. 10-2020-0108170, filed Aug. 26, 2020, the entire contents of which is incorporated herein for all purposes by this reference.

BACKGROUND

1. Field of the Disclosure

The present disclosure relates to a system and method for heating a battery using a motor driving system including an inverter and a motor provided in a vehicle, which increase the temperature of a battery by injecting alternating current (AC) current into the battery to repeatedly charge and discharge the battery.

2. Description of the Prior Art

Generally, eco-friendly vehicles driven using electrical energy include a battery that stores electrical energy, an inverter that converts electrical energy stored in the battery into AC power having a plurality of phases, and a motor that generates rotational kinetic energy using AC power converted by the inverter.

At present, many batteries of eco-friendly vehicles are lithium-ion batteries. Lithium-ion batteries have excellent performance with regard to energy density and number of charge/discharge cycles at room temperature. However, due to the characteristics of the electrolyte forming the lithium-ion battery, it has disadvantages of decreased capacity, increased resistance, and decreased efficiency at low temperatures. In particular, lithium ions are unevenly deposited on the surface of a negative electrode during charging or overcharging at a low temperature, thereby reducing the lifespan of the lithium ion battery. Accordingly, a lithium-ion battery requires a heating device capable of rapidly increasing the temperature from a low temperature to a high temperature with high efficiency.

Conventionally, a heater (e.g., a positive-temperature-coefficient (PTC) heater) is added to the battery to directly heat the battery or to heat and circulate coolant supplied to the battery. However, since such a conventional battery-heating method requires an additional heater, additional costs are incurred, and a total volume increases. As another conventional battery-heating technique, a method of generating heat inside the battery using electricity has been studied. In this method, the internal resistance of the battery is used, and the loss generated in proportion to the amount of current flowing through the battery is used as heat. This method has the advantage that the amount of heat in the battery is uniformly increased since current is uniformly conducted to the battery, but also entails increases in volume and cost due to requiring a separate dedicated circuit to pass current to the battery. In this method, an additional management point is generated for a dedicated circuit that generates and passes current for increasing the temperature of the battery, thereby complicating the maintenance of the vehicle.

The matters described as the art are merely for enhancing an understanding of the background of the present disclosure, and should not be taken as an acknowledgement that they correspond to the prior art already known to those of ordinary skill in the art.

SUMMARY

The present disclosure provides a system and a method for increasing the temperature of a battery using a motor-driving system including an inverter and a motor provided in a vehicle, which increase the temperature of the battery by injecting AC current into the battery to repeatedly charge and discharge the battery.

In accordance with an aspect of the present disclosure, a battery-heating system using a motor-driving system that may include an inverter having a plurality of legs respectively including a pair of switching elements connected in series between the two ends of a battery and corresponding to a plurality of phases; a motor having a plurality of coils each having a first end connected to a connection end between a pair of switching elements included in each of the plurality of legs, seconds ends of the plurality of coils being connected together; and a controller configured to determine one of the plurality of phases as a reference phase and to alternately control the on-off states of the switching elements so that the on-off state of the switching element included in the leg corresponding to the reference phase and the switching element included in the other leg are mutually complementary to generate AC current to be injected into the battery.

In an exemplary embodiment, the controller may be configured to control the on-off states of a pair of switching elements included in each of the plurality of legs to be in a complementary relationship. In particular, the controller may be configured control the on-off states of the switching element connected to both ends of the battery, among the switching elements in a leg corresponding to the reference phase, and the switching element connected to both ends of the battery, among the switching elements in the remaining leg, in a complementary relationship. In an exemplary embodiment, the controller may be configured to determine the reference phase, based on a rotor angle. In addition, the controller may be configured to select the reference phase to minimize the difference between an angle indicated by the motor current generated by alternately controlling the on-off state of the switching element on the dq stationary coordinate plane and the rotor angle.

In accordance with another aspect of the present disclosure, a battery-heating system using a motor-driving system may include an inverter having an a-phase leg, a b-phase leg, and a c-phase leg each including a pair of switching elements connected in series between the two ends of a battery; a motor including an a-phase coil having a first end connected to a connection node between a pair of switching elements included in the a-phase leg, a b-phase coil having a first end connected to a connection node between a pair of switching elements included in the b-phase leg, and a c-phase coil having a first end connected to a connection node between a pair of switching elements included in the c-phase leg, a second end of the a-phase coil, a second end of the b-phase coil, and a second end of the c-phase coil being connected to each other; and a controller configured to determine one of the a-phase, the b-phase, and the c-phase as a reference phase, and alternately control the on-off states of the switching elements so that the on-off state of the switching element included in the leg corresponding to the reference phase and the switching element included in the remaining legs are mutually complementary to generate AC current to be injected into the battery.

Additionally, the controller may be configured to control the on-off states of a pair of switching elements included in each of the plurality of legs to be in a complementary relationship. In particular, the controller may be configured to control the states of the switching element connected to both ends of the battery, among the switching elements in the leg corresponding to the reference phase, and the switching element connected to both ends of the battery, among the switching elements in the remaining legs, in a complementary relationship. The controller may be configured to determine the reference phase based on the rotor angle.

In an exemplary embodiment, the controller may be configured to determine the phase of a leg generating a motor current having a minimum difference from the rotor angle as a reference phase, among the angles indicated in the dq stationary coordinate plane by the motor current generated when controlling the switching element by determining the a-phase leg as a reference phase, the motor current generated when controlling the switching element by determining the b-phase leg as the reference phase, and the motor current generated when controlling the switching element by determining the c-phase leg as the reference phase.

The controller may be configured to determine the a-phase as the reference phase and alternately perform on-off control of the switching elements to generate the AC current when the rotor angle is 0° to 30°, 150° to 210°, and 330° to 360°. In addition, the controller may be configured to determine the c-phase as the reference phase and alternately perform on-off control of the switching elements to generate the AC current when the rotor angle is 30° to 90° and 210° to 270°. The controller may be configured to determine the b-phase as the reference phase and alternately perform on-off control of the switching elements to generate the AC current when the rotor angle is 90° to 150° and 270° to 330°.

In accordance with another aspect of the present disclosure a battery-heating method using a motor-driving system may include determining a section to which the rotor angle belongs; determining the reference phase based on the section to which the rotor angle belongs; and alternately controlling the on-off states of the switching elements so that the on-off state of the switching element included in the leg corresponding to the reference phase and the switching element included in the other leg are mutually complementary to generate AC current injected into the battery.

In an exemplary embodiment, when the rotor angle is 0° to 30°, 150° to 210°, and 330° to 360° in determining the section to which the rotor angle belongs, the determining the phase may include determining the a-phase as the reference phase, and the generating the AC current may include alternately controlling the on-off states of the switching element included in the a-phase leg and the switching elements included in the b-phase leg and c-phase leg to generate the AC current.

In addition, generating the AC current may include controlling the states of a pair of the switching elements each included in the a-phase leg, b-phase leg, and c-phase leg to be in a mutually complementary relationship and controlling the states of the switching elements connected to both ends of the battery, among the switching elements in the a-phase leg, and the switching elements connected to both ends of the battery, among the switching elements included in the b-phase and c-phase legs, to be in a complementary relationship. In an exemplary embodiment, when the rotor angle is 30° to 90°, and 210° to 270° in determining the section to which the rotor angle belongs, the c-phase may be determined as the reference phase, and the generating the AC current may include alternately controlling the on-off states of the switching element included in the c-phase leg and the switching elements included in the a-phase leg and the b-phase leg to generate the AC current.

In an exemplary embodiment, in generating the AC current, the states of a pair of the switching elements each included in the a-phase leg, the b-phase leg, and the c-phase leg may be controlled to be in a mutually complementary relationship, and the states of the switching element connected to both ends of the battery, among the switching elements in the c-phase leg, and the switching elements connected to both ends of the battery, among the switching elements included in the a-phase leg and b-phase leg may be controlled to be in a complementary relationship. When the rotor angle is 90° to 150°, and 270° to 330° in determining the section to which the rotor angle belongs, the determining of the phase may include determining the b-phase as the reference phase, and the generating of the AC current may include alternately controlling the on-off states of the switching element included in the b-phase leg and the switching elements included in the a-phase leg and the c-phase leg to generate the AC current.

The generating of the AC current may include alternately controlling the states of the pair of switching elements included in each of the a-phase leg, the b-leg leg, and the c-phase leg, and controlling the states of the switching element connected to both ends of the battery, among the switching elements included in the b-phase leg, and the switching elements connected to both ends of the battery, among the switching elements included in the a-phase leg and the c-phase leg, to be in a complementary relationship.

According to the battery-heating system and method using a motor-driving system, AC current may be injected into the battery using an inverter and a motor that are essential for driving an eco-friendly vehicle without adding a heating device such as a separate heater, thereby efficiently increasing the temperature of a battery without increasing costs. Particularly, according to the system and method for heating a battery using a motor-driving system, when AC current is generated using an inverter and a motor, torque pulsation generated by the motor may be suppressed as much as possible, thereby promoting a sense of stability of the vehicle.

The effects obtainable in the present disclosure are not limited to the above-mentioned effects, and other effects not mentioned can be clearly understood by those of ordinary skill in the art from the following description.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
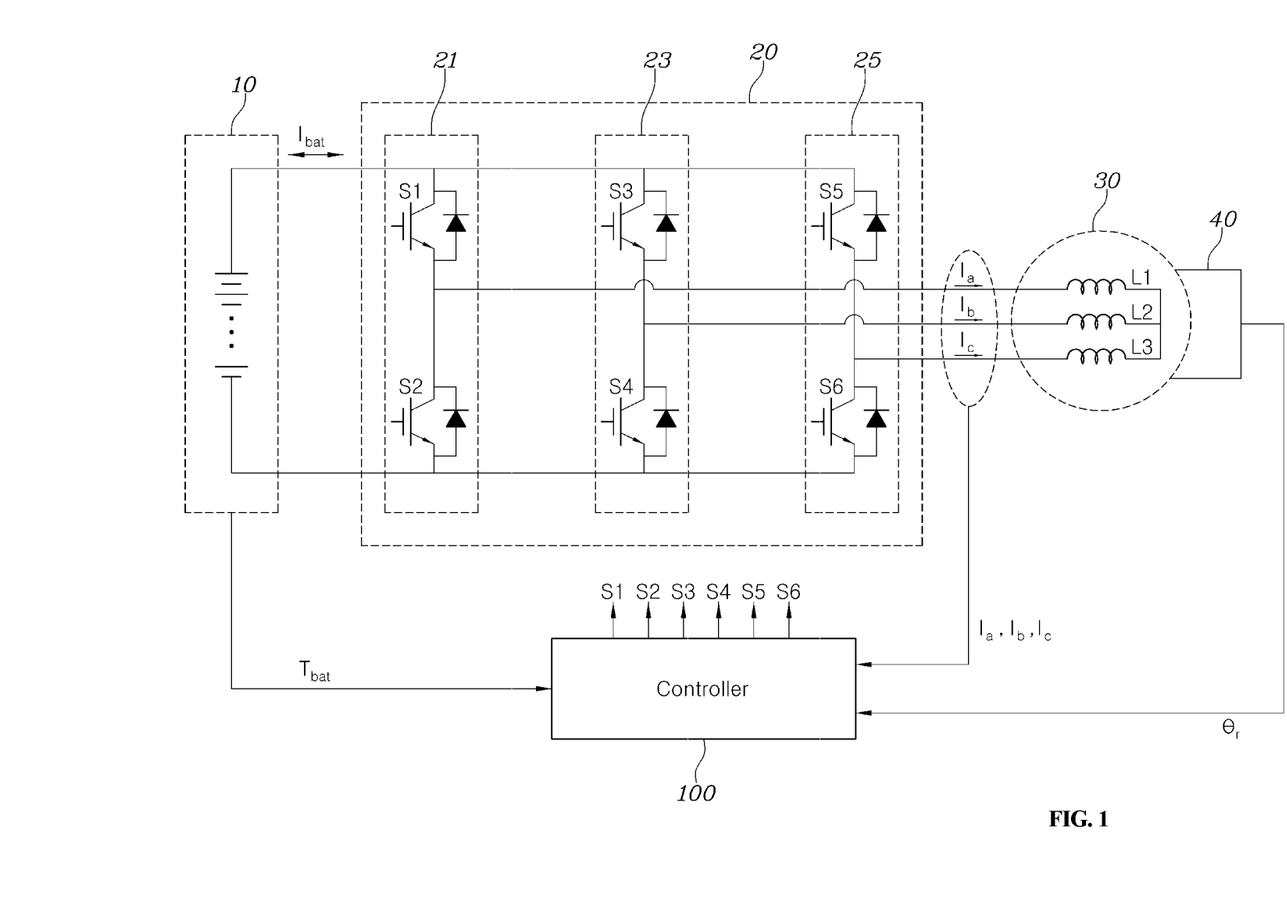
FIG. 1 is a circuit diagram of a system for increasing the temperature of a battery using a motor-driving system according to an exemplary embodiment of the present disclosure.

Hereinafter, a battery-heating system using a motor-driving system according to various exemplary embodiments will be described in detail with reference to the accompanying drawings. FIG. 1 is a circuit diagram of a system for increasing the temperature of a battery using a motor-driving system according to an exemplary embodiment of the present disclosure.

As illustrated in FIG. 1, a typical system for driving a motor 30 may include a battery 10, which is an energy storage device configured to store power for driving the motor, and an inverter 20 configured to convert the direct current (DC) power stored in the battery 10 into AC current having a plurality of phases and provides the AC current to the motor 30. The inverter 20 may have three legs 21, 23, and 25 connected in parallel to both terminals of the battery 10, two switching elements (two of S1 to S6) may be connected in series to each other in each leg 21, 23, and 25, and driving power of a single phase may be provided to the motor 30 from the connection node of the two switching elements. To drive such a motor, pulse width modulation of the switching elements S1 to S6 in the inverter 20 may be performed to provide current to the motor 30 in an amount corresponding to a current command corresponding to the torque of the motor 30 to be obtained through the driving of the motor 30.

In the battery-heating system using the motor-driving system according to an exemplary embodiment of the present disclosure, the states of the switching elements S1 to S6 in the inverter 20 may be controlled to inject AC current (pulsating current) into the battery 10 while suppressing the torque generated by the motor 10 using such a conventional motor-driving system. Specifically, the battery-heating system using the motor-driving system according to an exemplary embodiment of the present disclosure may include the battery 10, the inverter 20 having a plurality of legs 21, 23, and 25 each including a pair of switching devices S1 to S6 connected in series to both ends of the battery 10, a motor 40 having a plurality of coils L1, L2, and L3 respectively connected to connecting ends of the switching elements included in the legs 21, 23, and 25 in the inverter 20, and a controller 100 configured to operate a switching element included in one of the plurality of legs in the inverter 20 and a switching element included in the other leg in a complementary relationship to generate AC current to be injected into the battery 10.

For example, in an exemplary embodiment of the present disclosure, the controller 100 may be configured to operate a pair of switching elements included in each of the legs 21, 23, 25 in the inverter 20 to complement each other, but the controller 100 may be configured to complementarily control the switching element S1 connected to a positive (+) terminal of the battery 10 among the switching elements S1 and S2 included in the first leg 21, among the plurality of legs 21, 23, 25, and the switching elements S3 and S5 connected to the positive (+) terminal of the battery 10, among the switching elements included in the other two legs 23 and 25 to change the polarity of voltages applied to the coils L1-L3 corresponding to the plurality of phases, included in the motor 30, to apply the AC current to the battery 10.

When the heat generated from the internal resistance of the battery 10 is used to increase the temperature of the battery 10, important points to be considered are the amount of heat that is generated and efficiency. First, the amount of heat that is generated is proportional to the amount of current flowing through the battery 10. In other words, when a large amount of current flows through the internal resistance of the battery 10, regardless of the direction thereof, a large amount of heat is generated. In consideration of this point, the amount of heat that is generated by the battery 10 may be increased by increasing the amount of charge or discharge through charging that supplies DC current to the battery 10 or discharge that causes the DC current to be output from the battery 10.

Next, to improve efficiency, it is preferable to alternately charge and discharge the battery 10 than to perform only one of charging or discharging the battery 10. When the battery 10 is alternately charged and discharged as described above, the energy consumed by the battery 10 is minimal, but the amount of current flowing through the battery 10 may be increased, thereby improving energy efficiency and increasing the amount of heat that is generated. In other words, when an AC current, rather than direct current (DC), is injected into the battery 10, the current is repeatedly output from the battery 10 and input to the battery 10, thereby inducing heat generation of the battery 10 with high energy efficiency.

In particular, if the frequency of the AC current is sufficiently high, heat may be generated in the battery 10 while preventing concomitant lithium precipitation in the battery 10 and aging of the battery. Accordingly, in various exemplary embodiments of the present disclosure, the switching elements S1 to S6 in the inverter 20 may be controlled to inject AC current having a high frequency into the battery.

To inject AC current into the battery 10, an operation of receiving and storing energy from the battery 10 and providing the stored energy to the battery 10 is required. To store required energy, in various exemplary embodiments of the present disclosure, coils L1 to L3 corresponding to a plurality of phases provided in the motor 30 may be used. In other words, the AC current may be injected into the battery 10 by storing and discharging the energy in the coils L1 to L3 of the motor 30. On the other hand, to increase the temperature of the battery 10 by injecting high-frequency alternating current into the battery 10 using the inverter 20 and the motor 30, torque generation of the motor 30 should be prevented, in addition to securing the battery current as described above.

Figure 2:
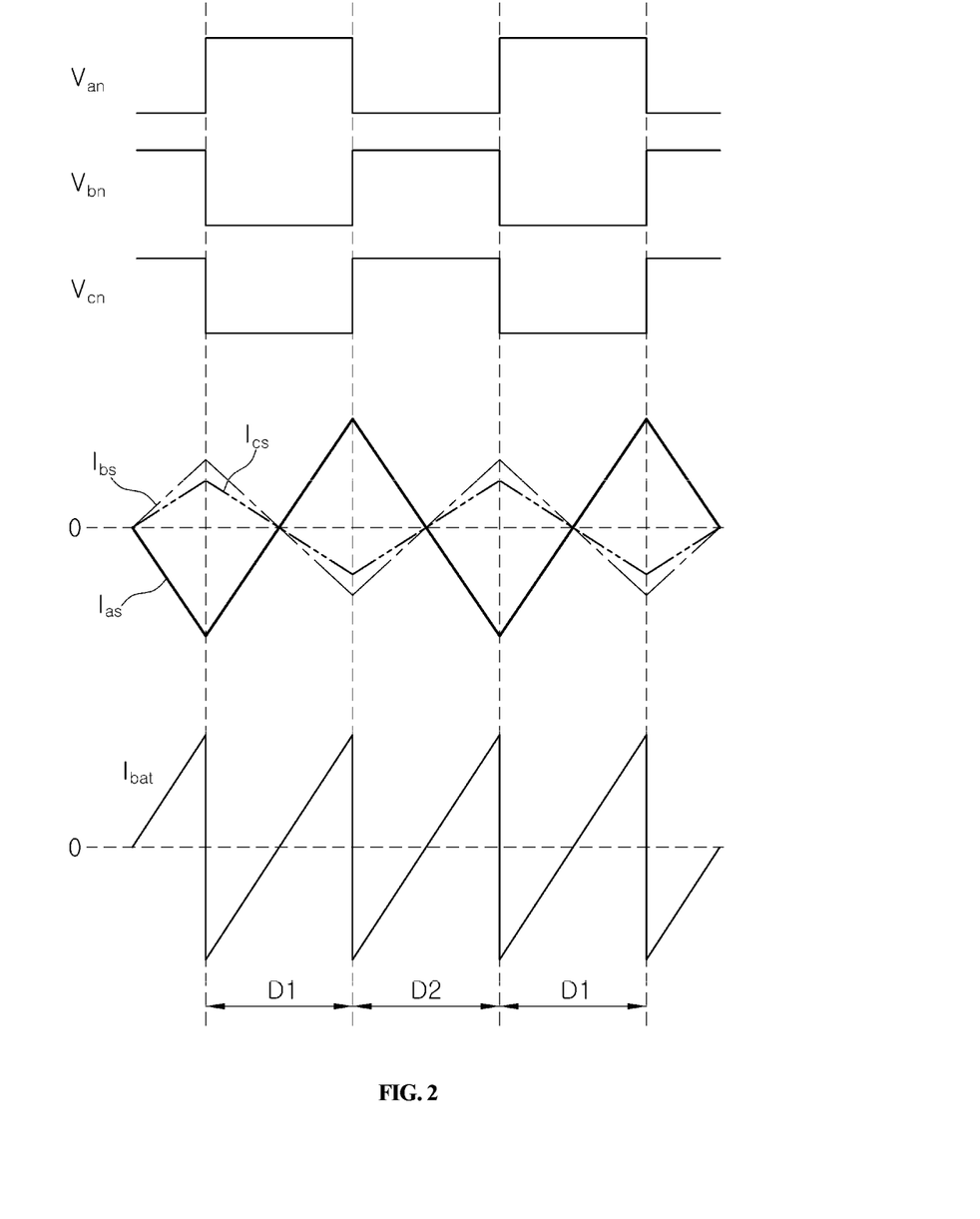
FIG. 2 is a waveform diagram illustrating a technique of generating battery current in a motor-driving system and method according to an exemplary embodiment of the present disclosure.
Figure 3:
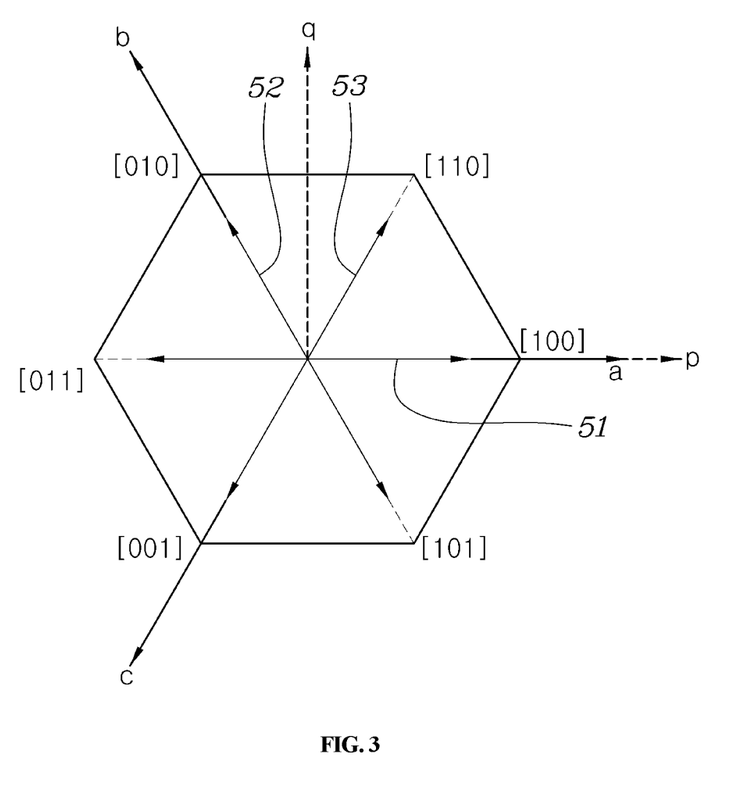
FIG. 3 is a vector diagram illustrating a technique for minimizing torque ripple in a motor-driving system and method according to an exemplary embodiment of the present disclosure.

FIG. 2 is a waveform diagram illustrating a technique of generating battery current in a motor-driving system and method according to an exemplary embodiment of the present disclosure, and FIG. 3 is a vector diagram illustrating a technique for minimizing torque ripple in a motor-driving system and method according to an exemplary embodiment of the present disclosure. A technique of generating AC current to be injected into a battery 10 and a technique of suppressing the generation of torque of a motor 30 in the process of generating the AC current injected into the battery 10 will be described in more detail with reference to FIGS. 2 and 3.

First, referring to FIG. 2, in the battery-heating system using the motor-driving system according to an exemplary embodiment of the present disclosure, the controller 100 may be configured to control the on-off states of the switching elements so that the on-off relationship between the switching elements included in one of the three legs included in the inverter 20 and the switching elements included in the other legs become complementary. FIG. 2 illustrates an example in which the switching elements in the first leg 21 and the switching elements of the second and third legs 23 and 25 are controlled to be in a mutually complementary relationship, in the example in which the connection ends of the switching elements S1 and S2 in the first leg 21 are connected to the a-phase coil L1 of the motor 30, the connection ends of the switching elements S3 and S4 in the second leg 23 are connected to the b-phase coil L2 of the motor 30, and the connection ends of the switching elements S5 and S6 in the third leg 25 are connected to the c-phase coil L3 of the motor 30.

In the 'D1' section shown in FIG. 2, the controller 100 may be configured to operate or control the switching elements S1-S6 so that the a-phase voltage Van provided to the a-phase coil L1 of the motor 30 becomes high and the b-phase voltage Vbn and the voltage Vcn applied to the b-phase coil L2 and the c-phase coil L3 become low. In other words, the controller 100 may be configured to turn on the switching element S1 and turn off the switching element S2 of the first leg 21, turn off the switching element S3 and turns on the switching element S4 of the second leg 23, and turn off the switching element S5 and turns on the switching element S6 of the third leg 25.

Accordingly, the a-phase coil L1 of the motor 30 may be connected to the positive (+) terminal side of the battery 10 in the section D1, and thus, the current Ias flowing through the a-phase coil L1 of the motor 30 increases, and the currents Ibs and Ics flowing in the b-phase coil L2 and c-phase coil L3 decrease. Particularly, in the currents Ias, Ibs, Ics of each phase, the direction of the current flowing from the inverter 20 to the motor 30 is referred to as a positive (+) direction, and the opposite direction is referred to as a negative (−) direction. Due to the electrical characteristics of the coil (inductor) that stores energy, even if an electric path is formed through switching of the switching elements, the current Ias, Ibs, or Ics flowing through each coil gradually increases or decreases.

The direction of the current may be changed after the direction of the current flowing in the previous section is maintained for a particular period of time. In particular, a first end of each of the coils L1, L2, and L3 corresponding to each phase of the motor 30 may be connected to a node in which a pair of switching elements included in each leg 21, 23, and 25 of the inverter 20 are connected, and second ends of the coils L1, L2, and L3 may be connected in common to form a neutral point.

When the 'D1' section is changed to the 'D2' section according to the preset switching frequency, the controller 100 may be configured to operate the switching elements S1, S2, S5, and S6 so that the b-phase voltage Vbn and the c-phase voltage Vcn respectively applied to the b-phase coil L2 and the c-phase coil L3 of the motor 30 are in high states, and the a-phase voltage Van provided to the a-phase coil L1 is in a low state. In other words, the controller 100 may be configured to turn off the switching element S1 and turn on the switching element S2 of the first leg 21, turn on the switching element S3 and turn off the switching element S4 of the second leg 23, and turn on the switching element S5 and turn off the switching element S6 of the third leg 25.

In particular, the switching frequency may vary according to the behavior of the vehicle to which the system of the present disclosure is applied or the temperature of the battery. The controller 100 may be configured to store, in advance, a factor that determines the switching frequency and map data in which a switching frequency corresponding to the factor is stored in advance, or a predetermined formula for calculating the switching frequency from this factor, and may be configured to obtain a switching frequency using map data or an equation stored when performing control for battery heating. Of course, the switching frequency as well as the switching duty may be determined using previously stored map data or a previously stored equation. FIG. 2 illustrates an example in which the switching duty is about 50%, but the switching duty may be changed as appropriate.

Since the specific method of determining the switching frequency and the switching duty is not directly related to the main technical idea of the present disclosure, further detailed description thereof will be omitted. Through such control, the b-phase coil L2 and the c-phase coil L3 of the motor 30 may be connected to the positive (+) terminal side of the motor 30 in the section D2 to increase the currents Ibs and Ics flowing through the b-phase coil L2 and the c-phase coil L3 and decrease the current Ias flowing through the a-phase coil L1. As described above, due to the characteristics of the inductor, even if the on/off state of the switching element is changed in the section D25, the size of the current flowing in the previous section D1 may be maintained for a particular period of time and gradually decreases, and the direction of the current changes after a certain period of time. At this time, even if the same voltage is applied to the b-phase coil L2 and the c-phase coil L3 of the motor 30, a difference in current may occur due to a difference in impedance between phases, which is a current pulsation that is not aligned with the phase a Particularly, since the average of each phase current converges to zero, there is no average torque.

In other words, if the switching period is changed, even if the connection state of the switching element is changed, since the current flow in the previous period is maintained for a particular period of time, the battery 10 may be in a charging state, which is a state in which current is input, and the battery 10 may enter a discharge state, in which current is output, until a change in the next switching period occurs after a particular period of time has elapsed. The current of the battery 10 that varies in this way is shown as 'Ibat' in FIG. 2. As shown in FIG. 2, the battery current that becomes an alternating current pulsating at a frequency of ½ of the switching period D1+D2, that is, twice the switching frequency. In summary, the battery-heating system using the motor-driving system according to an exemplary embodiment of the present disclosure may operate the switching elements in the inverter 20, but adjust the voltage applied to a coil corresponding to one phase of the motor 30 and the voltage applied to a coil corresponding to the other phase to be in a mutually complementary relationship according to a preconfigured switching frequency, thereby generating alternating current for injection into the battery 10.

Additionally, in one exemplary embodiment of the present disclosure, the generation of torque in the motor 30 should be prevented as much as possible during the control process of the switching elements S1 to S6 for increasing the temperature of the battery 10. As described above, in the method of generating the current by a method of complementarily determining the phase voltages of the coil corresponding to one phase and the coil corresponding to the other two phases of the motor, current may be generated as indicated by the arrows indicated by reference numerals '51, 52, and 53' shown in FIG. 3.

When the a-phase voltage and the remaining b-phase and c-phase voltages are controlled complementarily, a motor current 51 formed between vertices corresponding to the hexagonal [100] and [011] vectors may be formed, when the b-phase voltage and the remaining a-phase and c-phase voltages are controlled to be complementary to each other, a motor current 52 formed between vertices corresponding to the hexagonal [010] and [101] vectors may be formed. Additionally, when the c-phase voltage and the remaining a-phase and b-phase voltages are controlled to be complementary to each other, a motor current 53 formed between vertices corresponding to hexagonal [110] and [001] vectors may be formed. In particular, the arrows indicated by the reference numeral '51' correspond to 0° and 180°, based on the a-axis, the arrows indicated by the reference numeral '152' correspond to 120° and 300°, based on the a-axis, and the arrows indicated by the reference numeral '53' correspond to 60° and 240°, based on the a-axis.

Meanwhile, the torque generated by the motor according to the motor current may be expressed as Equation 1 below in the case of a permanent-magnet synchronous motor having a salient polarity.

$$T_e = \frac{3}{2}\frac{P}{2}[\lambda_f + (L_d - L_q)i_d]i_q \qquad \text{Equation 1}$$

In Equation 1, Te is the motor torque, λf is the electromotive force of the motor, Ld and Lq are the d-axis and q-axis inductance of the motor, and id and iq are the d-axis and q-axis currents of the motor. As shown in Equation 1 above, it can be seen that torque is not generated by the motor when the q-axis current is 0 (iq=0). In other words, when the motor current does not move along the q-axis of the synchronous coordinate system and exists only on the d-axis, torque is not generated in the motor.

Therefore, when the d-axis corresponding to the axis connecting the n-pole and the s-pole of the rotor of the motor 30 coincides with the arrow, as shown in FIG. 3, that is, when the rotor angle corresponds to the angles of the arrows 0°, 60°, 120°, 180°, 240°, and 300° as shown in FIG. 3, the torque of the motor 30 may be zero. Since the rotor position of the motor 30 is arbitrarily determined, in an exemplary embodiment of the present disclosure, the generation of torque may be minimized by selecting the phase at which the difference between the rotor angle detected by the rotor position sensor 40 provided in the motor 30 and the angle corresponding to the motor current generated by the on/off control of the switching element of the inverter 20 is minimized and performing on-off control of the switching element so that the voltages of the selected phase and the other two phases become mutually complementary.

Of course, instead of the rotor position sensor 40, the position of the rotor may be detected using a sensorless method known in the art. Since the sensorless algorithm for detecting the position of the rotor is already known in various ways in the art, an additional description thereof will be omitted. Referring to FIG. 3, when the rotor angle is 0° to 30°, 150° to 210°, and 330° to 360°, it is preferable to perform control based on the phase a corresponding to the arrow 51. In other words, it is preferable to alternately control the on-off state of the switching element at a preconfigured switching frequency so that the a-phase voltage and the remaining b-phase and c-phase voltages become mutually complementary.

In addition, when the rotor angle is 30° to 90° and 210° to 270°, it is preferable to perform control, based on the c-phase corresponding to the arrow 53. In other words, it is preferable to alternately control the on-off state of the switching element at a preconfigured switching frequency so that the c-phase voltage and the remaining a-phase and b-phase voltages have a mutually complementary relationship. In addition, when the rotor angle is 90° to 150° and 270° to 330°, it is preferable to perform control based on the b-phase corresponding to the arrow 52. In other words, it is preferable to alternately control the on-off state of the switching element at a preconfigured switching frequency so that the b-phase voltage and the remaining a-phase and c-phase voltages become mutually complementary.

Figure 4:
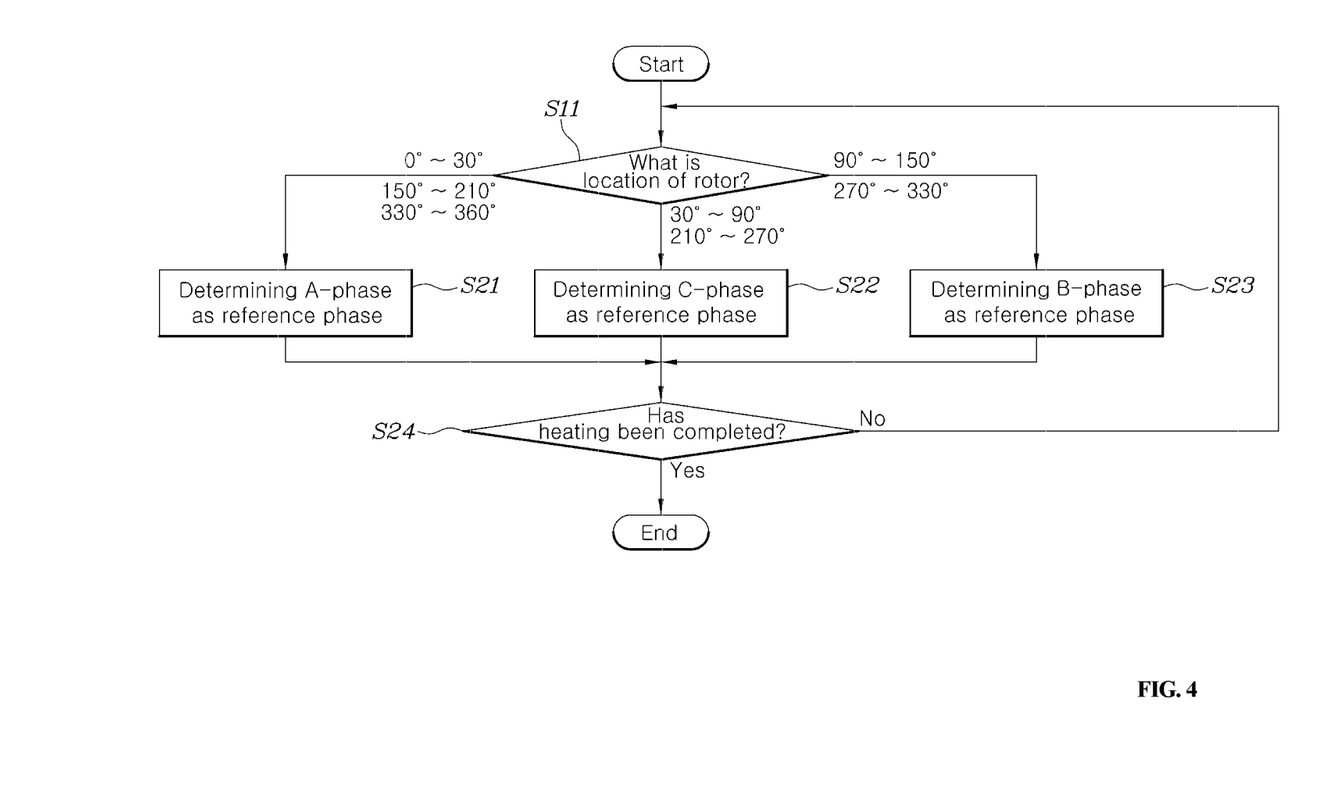
FIG. 4 is a flowchart illustrating a battery-heating method using a motor-driving system according to an exemplary embodiment of the present disclosure.

The present disclosure also provides a battery-heating method implemented by a battery-heating system using the motor-driving system as described above. FIG. 4 is a flowchart illustrating a battery-heating method using a motor-driving system according to an exemplary embodiment of the present disclosure.

Referring to FIG. 4, the battery-heating method using the motor-driving system according to an exemplary embodiment of the present disclosure may include an operation of receiving, by a controller 100, the rotor angle of the motor 30 detected by the rotor position sensor 40 and determining a section to which the rotor angle belongs (e.g., a section of the rotor angle) (S11), and operations (S21, S22, S23) of injecting an AC current into the battery 10 by operating the controller 100 to turn on and off the switching element at a preconfigured switching frequency by determining a phase as a reference, based on the section to which the rotor angle belongs. The above operations may be repeated until the temperature Tbat of the battery increases to a preconfigured target temperature (S24).

In operation S11, when the rotor angle belongs to sections of 0° to 30°, 150° to 210°, and 330° to 360°, the controller 100 may be configured to make a determination, based on the phase a voltage (S21). In other words, the alternating current may be generated by alternately operating the switching elements at a preconfigured switching frequency based on the on-off state of the switching element S1 of the first leg 21 of the inverter 20 so that the on-off state of the switching element S3 of the second leg 23 and the switching element S5 of the third leg 25 are complementary to the on-off state of the switching element S1 (S21).

In operation S11, when the rotor angle belongs to sections of 30° to 90° and 210° to 270°, the controller 100 may be configured to make a determination based on the c-phase voltage (S22). In other words, the alternating current may be generated by alternately operating the switching elements at a preconfigured switching frequency based on the on-off state of the switching element S5 of the third leg 25 of the inverter 20 so that the on-off states of the switching element S1 of the first leg 21 and the switching element S3 of the second leg 23 are complementary to the on-off state of the switching element S5 of the third leg 25 (S22).

In operation S11, when the rotor angle belongs to sections of 90° to 150° and 270° to 330°, the controller 100 may be configured to make a determination, based on the b-phase voltage (S23). In other words, the alternating current may be generated by alternately operating the switching elements at a preconfigured switching frequency, based on the on-off state of the switching element S3 of the second leg 23 of the inverter 20 so that the on-off states of the switching element S1 of the first leg 21 and the switching element S5 of the third leg 25 are complementary to the on-off state of the switching element S3 of the second leg 23 (S23).

If the angle of the rotor is a value corresponding to the boundary of the section, the reference phase may be any of the two corresponding phases in the two sections having the boundary. For example, when the rotor angle is 90°, one of the c phase and the b phase may be determined as a reference phase. However, to ensure that the three images are equally determined as the reference phase, it is preferable to determine an image having a smaller number of frequencies as the reference phase based on the frequency at which the reference phase was previously determined to be the reference phase.

As described above, according to the battery-heating system and method using the motor-driving system according to various exemplary embodiments of the present disclosure, efficient battery heating may be possible without an additional cost increase by injecting AC current into the battery using an inverter and a motor connected to a battery provided for driving an eco-friendly vehicle without a separate heating device. Particularly, when AC current is generated using an inverter and a motor, torque pulsation generated in the motor may be suppressed as much as possible, and a sense of stability of the vehicle may be achieved.

Although shown and described in connection with the specific be configured to embodiments of the present disclosure above, it will be apparent to those of ordinary skill in the art that the present disclosure can be variously improved and changed without exceeding the scope of the claims.

What is claimed is:

1. A battery-heating system using a motor-driving system, comprising:
    an inverter having a plurality of legs respectively including a pair of switching elements connected in series between both ends of a battery and corresponding to a plurality of phases;
    a motor having a plurality of coils each having a first end connected to a connection end between a pair of switching elements included in each of the plurality of legs, second ends of the plurality of coils being connected together; and
    a controller configured to determine one of the plurality of phases as a reference phase, and alternately control on-off states of the switching elements so that an on-off state of a switching element included in a leg corresponding to the reference phase and a switching element included in a remaining leg are mutually complementary to generate alternating current (AC) current to be injected into the battery.

2. The battery-heating system of claim 1, wherein the controller is configured to control on-off states of a pair of switching elements included in each of the plurality of legs to be in a complementary relationship, and wherein the controller is configured to control an on-off state of a switching element connected to both ends of the battery, among switching elements in a leg corresponding to the reference phase, and a switching element connected to both ends of the battery, among switching elements in the remaining leg, in a complementary relationship.

3. The battery-heating system of claim 2, wherein the controller is configured to the reference phase based on a rotor angle.

4. The battery-heating system of claim 3, wherein the controller is configured to select the reference phase so that a difference between an angle indicated by motor current generated by alternately controlling an on-off state of a switching element on the dq stationary coordinate plane and the rotor angle is minimized.

5. A battery-heating system using a motor-driving system, comprising:
    an inverter having an a-phase leg, a b-phase leg, and a c-phase leg, each including a pair of switching elements connected in series between both ends of a battery;
    a motor including an a-phase coil having a first end connected to a connection node between a pair of switching elements included in the a-phase leg, a b-phase coil having a first end connected to a connection node between a pair of switching elements included in the b-phase leg, and a c-phase coil having a first end connected to a connection node between a pair of switching elements included in the c-phase leg, a second end of the a-phase coil, a second end of the b-phase coil, and a second end of the c-phase coil being connected to each other; and
    a controller configured to determine one of an a-phase, a b-phase, and a c-phase as a reference phase, and to alternately control on-off states of the switching elements so that an on-off state of a switching element included in a leg corresponding to the reference phase and switching elements included in remaining legs are mutually complementary to generate alternating current (AC) current to be injected into the battery.

6. The battery-heating system of claim 5, wherein the controller is configured to control on-off states of a pair of switching elements included in each of the plurality of legs to be in a complementary relationship, and wherein the controller is configured to control states of a switching element connected to both ends of the battery, among switching elements in the leg corresponding to the reference phase, and the switching element connected to both ends of the battery, among the switching elements in the remaining legs, in a complementary relationship.

7. The battery-heating system of claim 5, wherein the controller is configured to determine the reference phase based on a rotor angle.

8. The battery-heating system of claim 7, wherein the controller is configured to determine a phase of a leg generating a motor current having a minimum difference from the rotor angle as a reference phase, among the angles indicated in the dq stationary coordinate plane by the motor current generated when controlling the switching element by determining the a-phase leg as a reference phase, the motor current generated when controlling the switching element by determining the b-phase leg as the reference phase, and the motor current generated when controlling the switching element by determining the c-phase leg as the reference phase.

9. The battery-heating system of claim 7, wherein the controller is configured to determine the a-phase as the reference phase and alternately perform on-off control of the switching elements to generate the AC current when the rotor angle is 0° to 30°, 150° to 210°, and 330° to 360°.

10. The battery-heating system of claim 7, wherein the controller is configured to determine the c-phase as the reference phase and alternately perform on-off control of the switching elements to generate the AC current when the rotor angle is 30° to 90° and 210° to 270°.

11. The battery-heating system of claim 7, wherein the controller is configured to determine the b-phase as the reference phase and alternately performs on-off control of the switching elements to generate the AC current when the rotor angle is 90° to 150°, and 270° to 330°.

12. A battery-heating method using the motor-driving system of claim 7, comprising:
    determining, by the controller, a section of the rotor angle;
    determining, by the controller, the reference phase based on the section of the rotor angle; and
    alternately controlling, by the controller, the on-off states of the switching elements so that an on-off state of the switching element included in the leg corresponding to the reference phase and the switching elements included in remaining legs are mutually complementary to generate AC current to be injected into the battery.

13. The battery-heating method of claim 12, wherein when the rotor angle is 0° to 30°, 150° to 210°, and 330° to 360° in determining the section of the rotor angle, the determining of the phase includes determining the a-phase as the reference phase, and the generating of the AC current includes alternately controlling on-off states of the switching element included in the a-phase leg and switching elements included in the b-phase leg and the c-phase leg to generate the AC current.

14. The battery-heating method of claim 13, wherein the generating of the AC current includes:
    controlling, by the controller, states of a pair of the switching elements each included in the a-phase leg, the b-phase leg, and the c-phase leg to be in a mutually complementary relationship, and
    controlling, by the controller, states of the switching elements connected to both ends of the battery among the switching elements in the a-phase leg and the switching elements connected to both ends of the battery among the switching elements included in the b-phase and c-phase legs to be in a complementary relationship.

15. The battery-heating method of claim 12, wherein when the rotor angle is 30° to 90°, and 210° to 270° in the determining the section of the rotor angle, the c-phase is determined as the reference phase, and wherein the generating of the AC current includes alternately controlling an on-off state of the switching element included in the c-phase leg and the switching elements included in the a-phase leg and the b-phase leg to generate the AC current.

16. The battery-heating method of claim 15, wherein in the generating of the AC current, states of a pair of the switching elements each included in the a-phase leg, the b-phase leg, and the c-phase leg are controlled to be in a mutually complementary relationship, and states of the switching element connected to both ends of the battery among the switching elements in the c-phase leg and the switching elements connected to both ends of the battery among the switching elements included in the a-phase leg and the b-phase leg are controlled to be in a complementary relationship.

17. The battery-heating method of claim 12, wherein when the rotor angle is 90° to 150°, and 270° to 330° in determining the section of the rotor angle, the determining of the phase includes determining the b-phase as the reference phase, and the generating of the AC current includes alternately controlling the on-off states of the switching element included in the b-phase leg and the switching elements included in the a-phase leg and the c-phase leg to generate the AC current.

18. The battery-heating method of claim 17, wherein the generating the AC current includes:
    controlling, by the controller, states of the pair of switching elements included in each of the a-phase leg, b-leg leg, and c-phase leg, and
    controlling, by the controller, states of the switching element connected to both ends of the battery among the switching elements included in the b-phase leg and the switching elements connected to both ends of the battery among the switching elements included in the a-phase leg and the c-phase leg to be in a complementary relationship.

* * * * *